Nov. 15, 1932.  A. JACOBSEN  1,888,087
AUTOMATIC CASTING ANTIBACKLASH FISHING REEL
Filed Dec. 26, 1930  2 Sheets-Sheet 1

INVENTOR.
ARTHUR JACOBSEN
BY
ATTORNEY.

Nov. 15, 1932.  A. JACOBSEN  1,888,087
AUTOMATIC CASTING ANTIBACKLASH FISHING REEL
Filed Dec. 26, 1930   2 Sheets-Sheet 2
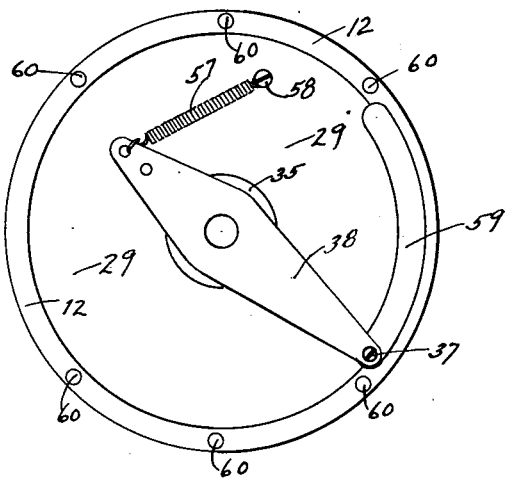
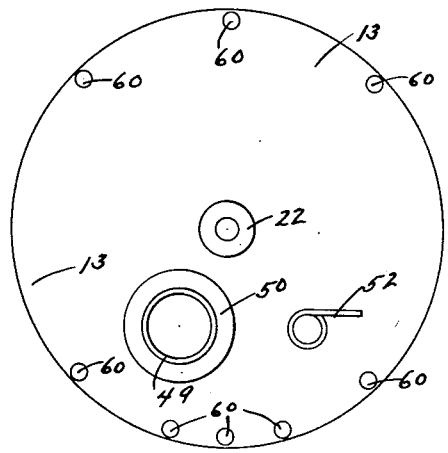
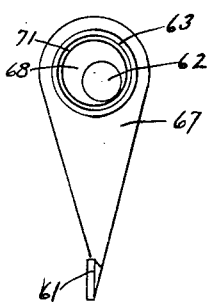
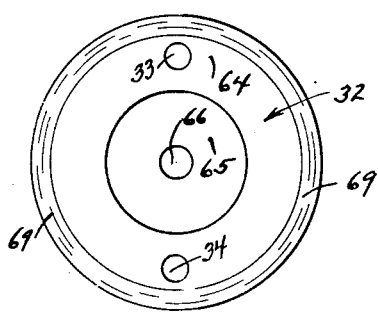
INVENTOR.
ARTHUR JACOBSEN
BY
ATTORNEY.

Patented Nov. 15, 1932

1,888,087

UNITED STATES PATENT OFFICE

ARTHUR JACOBSEN, OF SAN FRANCISCO, CALIFORNIA

AUTOMATIC CASTING ANTIBACKLASH FISHING REEL

Application filed December 26, 1930. Serial No. 504,703.

The present invention relates to improvements in automatic casting anti-back-lash fishing-reels, and has for its principal object the provision of means to be borne by fishing reels that will automatically permit of the free running of a cast fishing line and the prevention of the piling-up and entanglement of the line at the reel-body through the increased reel-off of the line beyond the measure of the casting pull, due to an increased speed of the reel and its dispensing a greater amount of line than is taken up through the casting action or run of the line.

A further object of the invention is the provision of means automatically operating for the control of the reel action, both as to its free pay-out of line during the cast and in the prevention of all possibility of the so-called back-lash, or piling-up of line through an increased speed of the reel beyond that actually required in the paying-out of the cast line.

An additional object of the present invention is the provision of simple means for governing the action of fishing-reels in the paying-out of line during a cast, both in the direction of affording an automatically pay-out of line, as well as a preventative means against lash and permitting a free-running pay-out of cast line, and these within easy and ready control of the angler.

Other objects of the invention will be made to appear as this specification progresses, and will be more clearly set forth in the claims hereto appended and forming a part hereof.

In the accompanying drawings, forming a part of this specification, and, in which, similar parts are designated by like reference characters, throughout:

Figure 3 is a side-elevation of the casing, showing the slotted portion through which the brake actuating-rod moves, and the leverage and spring for tensioning the line;

Figure 4 is a side elevation of the reel-casing as viewed from the crank side, showing the base and hollow circular stud for the positioning of the eccentric gear-adjusting lever;

Figure 5 is a side elevation of the eccentric gear-adjusting lever; and

Figure 6 is a view of the disc in elevation, and as used for braking or regulating the speed of the rotating spool.

Figure 1:
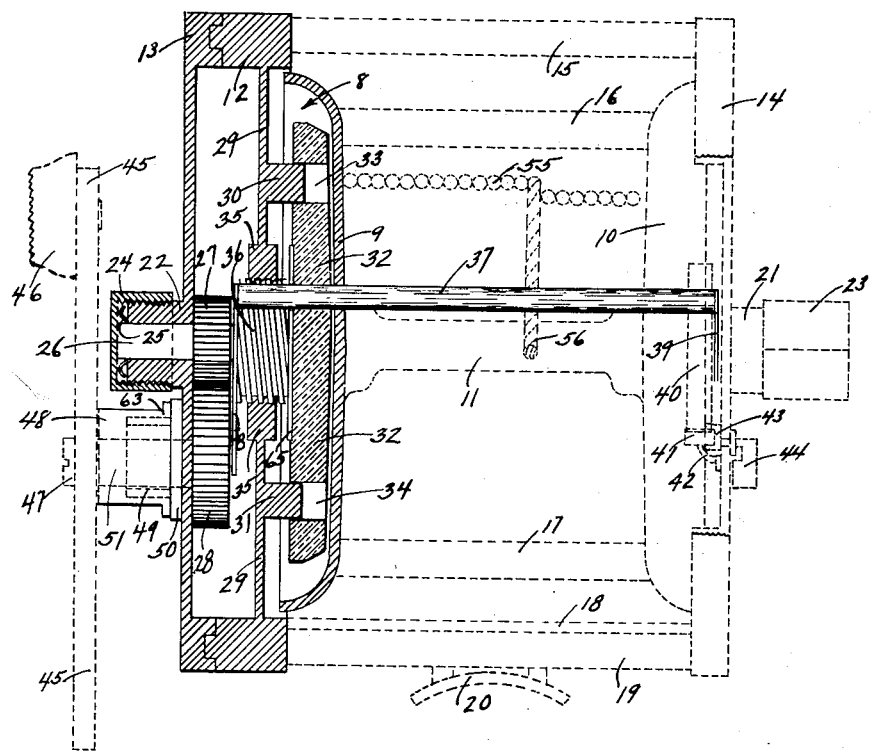
Figure 1 is an enlarged view in elevation of the reel, showing the anti-back-lash and braking mechanisms, the eccentric disengaging lever, and the spool-positioning means in operative relation with the other parts comprising the reel.

Referring more particularly to the drawings, the numeral 8 indicates the reel-spool; 9 the side of the spool against which the disc 32 presses in frictional engagement; 10 the opposite end of the reel-spool; 11 the central spool-shaft; 12 the intermediate frame; 13 and 14 extra outer frame discs; 15, 16, 17, 18 and 19 rod connections between extra and intermediate frames for spacing these apart; 20 the spool-base adapted for connection of the reel to the fishing-rod; 21 and 22 spool-shaft bearings; 23 and 24 spool-shaft bearing thrust-nuts; 25 split-spring thrust-washer for preventing thrust-nuts from working loose; 27 gear on spool-shaft; 28 gear on eccentrically mounted shaft; 26 rounded end of spool-shaft serving as bearing; 29 member bearing studs and threaded openings supporting the casing wall; 30 and 31 studs borne thereby; 32 the fibre disc; 33 and 34 openings in disc for the accommodation of studs adapted to retain the disc in fixed alignment; 35 interiorly threaded opening in member 29; 36 threaded screw fitted for travel within the threaded opening 35; 37 line drop-shaft and brake-applicator; 38 and 39 drop-shaft levers, 38 being detachably secured by a screw 70 to 37 and 39 fixedly secured thereto and free for slidable movement on shaft 26; the ratchet-gear 40 provided with any conventional click-mechanism 41 having a spring 42; 43 lever for disengaging click-mechanism; 44 a finger-lever for actuating 43; 45 operating-crank having a handle 46 and a retaining-screw 47; 48 body of lever for disengaging gear 28 from gear 27; 49 drilled stud having a stud-base 50; 51 gear and crank-shaft; 52 thumb-lever; 53 the L-shaped lever for raising drop-bar so brake-mechanism will not be applied when not needed; 54 flatted section on shaft 26 for retaining gear; 57 spring for depressing drop-bar; 58 spring-retaining screw; 59 slotted section for drop-bar travel; 60 holes for screws for assembling; 61 thumb-lever on eccentrically mounted gear-shaft for causing disengagement of gears; 62 eccentrically placed bearing; 63 guide ring; 64 face of friction disc; 65 metal backing thereof; 66 bearing-hole; 67 the lever for disengaging the gears; and 69 curved or rounded corners.

Figure 2:
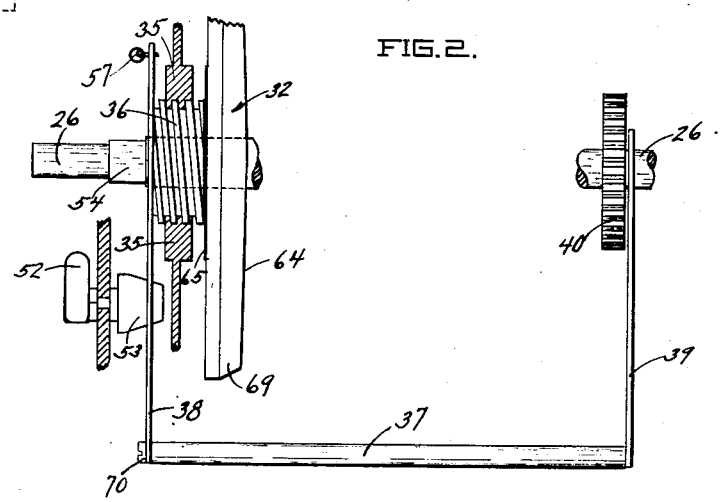
Figure 2 is an enlarged diagrammatic view, showing the anti-back-lash and braking mechanisms as they would apear if lifted from the reel.

In the operation of the reel, it is first necessary to center the spool 8 for free rotation; this is done by adjusting the spool bearing caps 23 and 24 which abut against the ends of the spool-shaft 26. The caps 23 and 24 are kept from turning by split-spring washers 25 abutting the ends of the spool-shaft bearings 22 and 21. The spool 8 is caused to rotate in bearings 21 and 22 by gear 27, slidably fitted on square section 54 as shown in Figure 2, engaging the gear 28, which is rigidly connected to shaft 51, to which is attached crank 45 held by screw 47. The gear 28 may be caused to be disengaged from gear 27 by means of eccentric lever 67 shown in Figure 5. The eccentric lever 67 has a tubular circular guide ring 63, which engages concentrically projecting circular ring 49 on the base 50, which is a part of the reel housing 13. The stud 68, which is concentric to circular ring 63 and circular recess 71, has an eccentrically drilled hole 62, which acts as a bearing for shaft 51 carrying gear 28. The gears 27 and 28 can be engaged or disengaged by movement of lever 67 which causes the eccentrically placed bearing 62 to move the shaft 51 carrying gear 28 toward or away from gear 27.

The click mechanism consisting of gear 40, shown in Figures 1 and 2, engages a click device made up of a block 41 which engages the teeth of gear 40 and is held in place by spring 42, to which it is attached, the other end of the spring 42 being fast to reel housing 14. The click mechanism can be disengaged by turning lever 44, which causes the arm 43, which is attached to lever 44, to depress the spring carrying the click block 41 out of the path of travel of the gear teeth of gear 40. When the line is paying out and the anti-back-lash mechanism is operating, the line 56, due to tension of line, raises the bar 37, which extends across the front of the spool 8. The bar 37, when raised, moves the levers 38 and 39, which are fulcrumed on the shaft 26, and acts against the spring tension of spring 57 shown in Figure 3. The lever 38 has threaded section 36 rigidly affixed to it and which rotates and advances horizontally in threaded hub 35. The face of the threaded worm is flat and engages a flat metallic circular disc 65, which is submerged into the surface of a friction disc 32. The raising or lowering of the bar 37 turns the levers 38 and 39, the lever 38 causing the threaded worm 36 to travel in a to-and-fro horizontal movement and imparting that movement to the friction disc 32, the surface 64 of which engages the surface 9 of spool 8 and causes a retardation of the angular momentum of the spool and consequent unravelling of the line, or the release of the friction braking-disc for free rotation of the spool.

When the anti-back-lash feature is not desired, the thumb-lever 52, shown in Figure 2, can be turned so that the L-shaped lever 53 is caused to engage the under side of lever 38 and raise the lever 38 so that the threaded worm 36 causes the friction disc 32 to move away from face 9 of the spool 8, allowing free rotation of the spool.

The reel may be made to operate in any one of the following manners:

The adjustment of the braking mechanism may be such as to permit the spool to turn entirely free;

The click mechanism may be manipulated to provide any degree of drag upon the line;

The anti-back-lash mechanism may be applied in manner as previously explained;

The crank gear may be engaged or disengaged at will; or

Any or all of the combinations of the above mechanisms and movements may be employed to provide for either a drag of any degree or a free-running spool.

A most important feature to be borne in mind is that the tauting and slacking action of the fishing-line as paid-out by the reel-spool is transmitted in such manner to the braking-disc and thence to the end surface of the reel-spool as to bring to bear thereagainst a force possessing all the properties of the compound lever, thereby providing through these agencies instant and readily controlled action and a braking force of a character impossible to be supplied by spring-urged or similar means.

Having thus described my invention, I claim, and desire to secure by Letters Patent of the United States, the following:

1. In a fishing reel, a shaft, a reel spool mounted on said shaft, said reel spool having a braking surface, a braking disc slidable on said shaft adjacent said braking surface, means for bringing said braking disc into frictional engagement with said braking surface, said means comprising a pair of levers slidably mounted on said shaft, a line drop shaft connecting the free ends of said levers, a nut operatively connected to one of said levers between the friction disc and said mentioned lever, a threaded hub for said nut whereby movement of said line drop shaft in one direction will rock said levers and rotate said nut in said hub to cause the friction disc to contact with the adjacent braking surface.

2. In a fishing reel, a shaft, a reel spool mounted on said shaft, said reel spool having a braking surface, a braking disc adjacent said braking surface, means for bringing said braking disc into frictional engagement with said braking surface, said means comprising a pair of levers loosely mounted on said shaft, a line drop shaft connecting the free ends of said levers, a nut fixed to one of said levers between the friction disc and said mentioned lever, a threaded hub for said nut whereby movement of said line drop shaft in one direction will rock said levers, and rotate said nut to cause the friction disc to contact with the adjacent braking surface, and a spring for retracting said line drop shaft and said levers to normally inoperative positions.

3. In a fishing reel, a shaft, a reel spool mounted on said shaft, said reel spool having a braking surface, a braking disc on said shaft adjacent said end member, means for bringing said braking disc into frictional engagement with said braking surface, said means comprising a pair of levers slidably mounted on said shaft, a line drop shaft connecting the free ends of said levers, a nut fixed to one of said levers, a threaded hub for said nut whereby movement of said line drop shaft in one direction will rock said levers and advance said nut in said hub towards said friction disc and cause the latter to contact with the braking surface, and manually operative means for rocking said line drop shaft and said levers in the opposite direction to withdraw said nut and said friction disc from said friction surface.

4. In a fishing reel, a shaft, a reel spool mounted on said shaft, said reel spool having a braking surface, a braking disc on said shaft adjacent said braking surface, means for bringing said braking disc into frictional engagement with said braking surface, said means comprising a pair of levers loosely mounted on and depending from said shaft, a line drop shaft connecting the lower free ends of said levers, means on one of said levers adapted to travel on said first named shaft towards and away from said friction disc to cause said friction disc to advance and retract from said braking surface.

5. In a fishing reel, a shaft, a reel spool mounted on said shaft, said reel spool having a braking surface, a braking disc on said shaft, means for bringing said braking disc into frictional engagement with said braking surface, said means comprising a pair of levers carried by said shaft, a line drop shaft connecting the free ends of said lever, a nut fixed to one of said levers between the friction disc and said mentioned lever, a threaded hub for said nut, means carried by said hub engaging said friction disc and supporting the same in alignment with said braking surface.

6. In a fishing reel, a spool shaft, a reel spool mounted on said shaft, means for rotating said spool shaft, said means comprising a gear on said spool shaft and a second gear engaging said first mentioned gear, means for manually operating said second gear, said reel spool having a braking surface, a braking disc on said shaft adjacent said braking surface, means for bringing said braking disc into frictional engagement with said braking surface, said means comprising a pair of levers loosely mounted on said shaft, a line drop shaft connecting the free ends of said levers, means on one of said levers in line with said friction disc whereby movement of said line drop shaft in one direction will rock said levers to cause the friction disc to contact with the adjacent braking surface, said braking surface and said braking disc constituting means for intermittently braking the rotation of said shaft, and means for moving said second named gear out of engagement with said first named gear.

7. In a fishing reel, a shaft, a reel spool mounted on said shaft, said reel spool having a braking member, a braking member on said shaft adjacent said first named braking member, means for bringing said braking members into engagement with each other, said means comprising a pair of levers loosely mounted on said shaft, a line drop shaft connecting said levers, means on one of said levers for advancing and retracting said second named braking member when the line drop shaft with said levers is rocked in one direction, and means for normally returning said second named braking member to its inoperative position, said last named means comprising a spring coacting with said mentioned lever.

In testimony whereof I hereunto affix my signature.

ARTHUR JACOBSEN.